Jan. 18, 1938.  McKINLEY PALMER  2,105,495
VALVE CONSTRUCTION
Filed Oct. 7, 1936   2 Sheets-Sheet 1
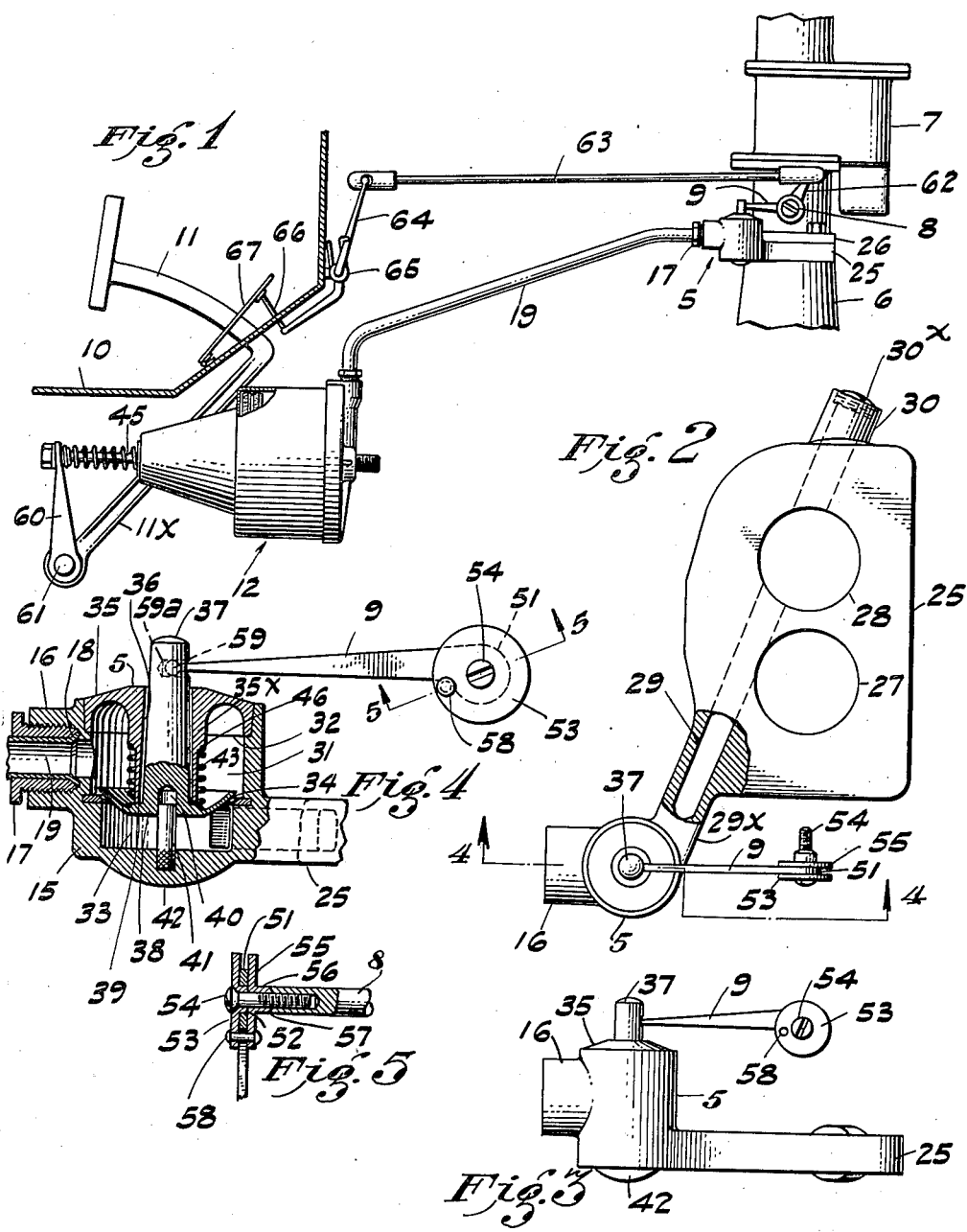
McKINLEY PALMER
INVENTOR.
BY
ATTORNEY.

Jan. 18, 1938. McKINLEY PALMER 2,105,495
VALVE CONSTRUCTION
Filed Oct. 7, 1936 2 Sheets-Sheet 2
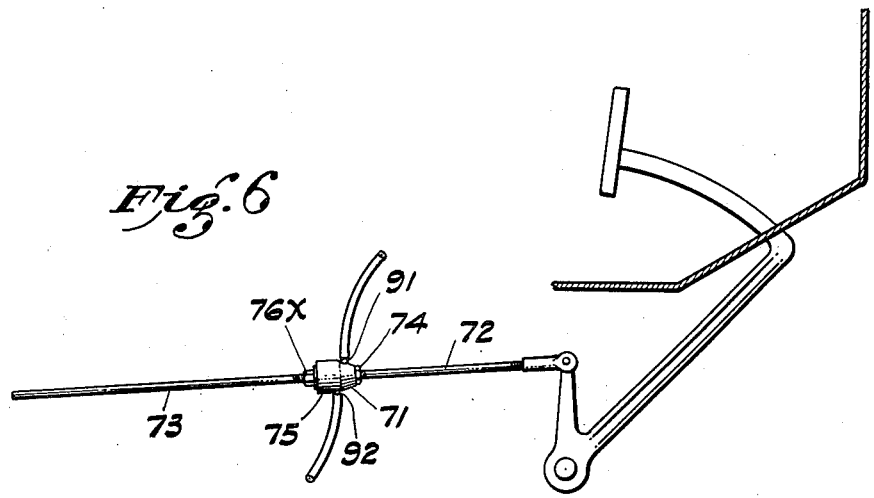
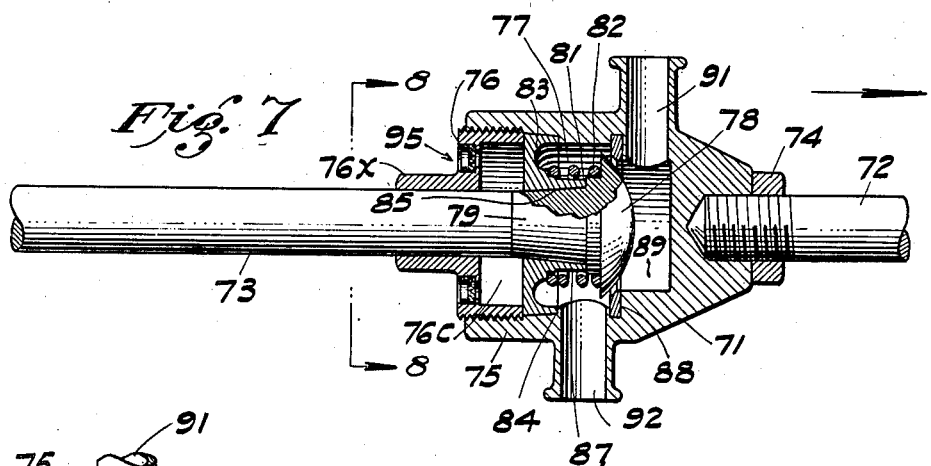
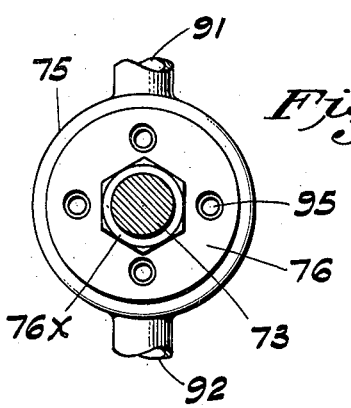
McKINLEY PALMER
INVENTOR.
BY 
ATTORNEY.

Patented Jan. 18, 1938

2,105,495

UNITED STATES PATENT OFFICE 2,105,495

VALVE CONSTRUCTION

McKinley Palmer, Beverly Hills, Calif..

Application October 7, 1936, Serial No. 104,500

7 Claims. (Cl. 192—.01)

This invention relates in general to vacuum power operated means for actuating the clutch mechanism of an automobile or like vehicle and in particular to the valve construction per se disclosed in my Automatic clutch control Patent #2,050,729, issued August 11, 1936, and pending application for Vacuum operated device, Ser. No. 2,662, filed January 21, 1935.

My invention, although directed specifically to the valve structure per se as stated, additionally provides improved means whereby the mechanisms disclosed in said patent and application are, by the substitution of my improved valve, more effectively operated.

It is an important object of the invention to provide an improved valve structure which may be used as a unit for accomplishing still other purposes than that of operating an automatic clutch control, for example as would be the case in operating the opening and closing of doors on stages and busses; in operating the brake mechanisms of automobiles; and in operating their transmission gearing.

A further object of the invention is the provision of a valve which when used for the purpose of assisting in operating an automatic clutch control, also performs its function in such a manner that the governing of the automobile by the driver is greatly simplified and efficiency in manipulating is increased.

Additional features providing still further objects of the invention reside in the novel construction of means to guide the valve in its reciprocatory movement; the tapered valve shank or stem which graduates passage of free atmospheric pressure and which eliminates sticking, and gives to the valve a pendulous seating; and novel shifting means whereby the valve is shifted from one position to another wherein one aperture is made a common communicant with suction and atmosphere.

Referring to the accompanying drawings, which illustrate what are at present deemed to be preferred embodiments of the invention, Fig. 1 is a view, mainly in side elevation, showing the device and associating therewith a portion of an engine control means with which it is combined. Parts are sectioned, and other parts are broken away to contract the view.

Fig. 2 is a plan view of the structure per se shown in the right hand portion of Fig. 1, illustrating a part of the body portion being adapted to be placed in communication with a carburetor having a dual intake and the manifold of a gas engine also having a corresponding dual intake, a part thereof being broken away to show the tapered passageway communicating with the valve chamber whereby suction from a motor is brought to act on the valve.

Fig. 3 is an elevation of the valve structure shown in Fig. 2.

Fig. 4 is a vertical section on line 4—4 of Fig. 2.

Fig. 5 is a section on line 5—5 of Fig. 4.

Fig. 6 shows in side elevation, a modification of the valve structure, in which it is connected up with a braking mechanism.

Fig. 7 is a longitudinal mid-section on a larger scale than Fig. 1, only fragments of the brake rod being shown.

Fig. 8 is a cross section on line 8—8 of Fig. 7.

Referring in detail to the drawings, 5 designates in a general way the valve structure which forms the subject matter of the present application, the same being shown associated with an engine manifold 6, having a carburetor 7 and butterfly valve shaft 8, the operating arm 9 of said valve structure 5 being mounted upon this shaft. In the left hand portion of Fig. 1 are shown the vehicle frame fragment 10 and clutch pedal 11, and also the piston and piston cylinder structure 12 which is claimed in my copending application of even date.

The valve structure 5 includes a body portion 15 having an internally threaded boss 16 extending therefrom into which screws a coupling member 17 for attaching the outwardly flanged end portion 18 of the pipe 19 which leads to the aforesaid piston cylinder 12.

The valve member 15 is shown having integral therewith an adapter or insert plate 25 of the same shape as the connecting flange 26 of the carburetor manifold and the intake manifold 6. Said adapter plate 25 has extending transversely thru it two circular openings 27 and 28 which register with like openings in the parts above and below it. Also, thru said adapter extends a passage 29 one end portion of which is continued thru the neck 29x to the valve chamber 33. At the opposite end of said passage is shown a boss 30 which is shown closed by means of a screw plug 30x.

The valve body 15 has a circular chamber 31 therein and a circular aperture 32 which opens thru the top of said body and communicates with said chamber. Said body 15 has in its lower portion a diametrically reduced circular recess 33 which is coaxial with the chamber 15 and with the aperture 32 in the top thereof. A lower valve seat 34 is located at the juncture of chamber 31 and recess 33.

A cap 35 is fitted within the top aperture 32, said cap having a tubular downward extension 35x. Axially thru said extension leads a frusto-conical passage 36 and within this passage is loosely fitted a valve stem 37 carrying at its lower end a valve head 38 the lower surface of which cooperates with the seat 34 and the upper surface of which cooperates with a valve seat 39 which surrounds the larger, lower end of the passage 36 thru cap 35.

Into the lower end portion of valve stem 37 extends an axial bore 40 and within this bore extends with a free working fit a guide pin 41 whose knurled end is anchored in and upstands from a thickened base portion 42 with which the valve body 15 is furnished. A weak spring 43 surrounds the tubular downward cap extension 35x and acts between a shoulder 46 around said extension and the upper side of the valve head 38. This spring aids gravity to move the valve head to its position on seat 34.

On the outer end of shaft 8 of the butterfly valve is loosely mounted, the operating or radial arm 9, the construction of this part of the device being shown in detail in Fig. 5. The pivoted end of said arm has an expanded, disk-like portion 51 which has a central aperture to fit around a circular boss 52 formed at the center of a mounting disk 53. Disk 53 has a central hole which receives the attaching screw 54 which is tapped into the outer end of the shaft 8. Between the end of shaft 8 and the disk 53 is interposed an intermediate disk 55 having a central cylindrical boss 56 which has a beveled end portion. The adjacent end of the shaft 8 is reversely beveled at the same angle thus providing an interlocking or overlapping joint 57 that affords a stable mounting means for the arm 9 when the screw 54 is in place as shown in Fig. 5. This part of the structure is completed by a pin 58 which extends thru alined holes in the peripheral portions of disks 53 and 55 and serves as a means for tilting upwardly the arm 9 when the shaft 8 is rocked in the proper direction to cause this to occur.

Arm 9 is shown as consisting of a flat strip of metal which is tapered towards its free end where it terminates in a slightly enlarged circular extremity 59 which has a working fit within a recess 59a cut laterally into the portion of valve stem 37 which projects above cap 35.

The butterfly valve shaft 8 is furnished with a radial operating arm 62 which is actuated by a rod 63 which, in turn, is connected with the free end of a foot-actuated lever 64 pivoted between its ends at 65. Below its pivot 65 lever 64 is connected by link 66 to the accelerator pedal 67 mounted upon the frame 10.

The clutch pedal 11, which has already been mentioned, has a downward extension 11x fixed to the rock shaft 61. Said shaft 61 operates the piston mechanism 12 by means of the arm 60 and spring-controlled piston rod 45, these parts, separately considered, forming no part of the invention claimed in this application.

The operation of the mechanism disclosed in Fig. 1 from the time the driver seats himself in the car until the same is stopped involves the following steps, it being understood that before the motor is started the automotive vehicle is equipped with the automatic clutch control, which has been described in my patent and pending application before referred to and which is partly repeated herein, and all the parts in the several views occupy the positions therein shown, and the clutch (not shown) is in the engaged or clutching location.

The operator first places the gear shift lever 5 in neutral position, turns on the ignition and steps on the starter actuating the motor.

As soon as the motor starts functioning its vacuum draws the piston, shown in Fig. 1, to the head or opposite end of the cylinder. This movement of the piston disengages the clutch, such movement being effected thru the medium of means operated by the throw out lever. Due to the suction thus created by the motor the piston remains in the retracted position and in turn the clutch remains in the disengaged position. The parts mentioned remain in such location until the accelerator is actuated. At this time in the performance of the operation, the gear shift lever may be actuated at random thru all the forward and reverse producing gears whether the car be in motion or not. It will therefore be understood that, should the car be coasting on a grade or free wheeling as a result of momentum gained thru power, the gear shift lever may be actuated from a high to a lower transmission gear and vice versa to advantage.

Upon actuating or depressing the accelerator the butterfly valve shaft 8 of the carburetor is rotated to open position thereby rotating anti-clockwise the tripping mechanism which includes the trip pin 58, permitting the valve head to move from the location shown in Fig. 4 (wherein the passageway 36 is shown closed) to its extreme position wherein the aperture at seat 34 is closed. As soon as the pin is rotated as stated all support is removed from under arm 9, for arm 9 is freely mounted on the tripping mechanism betwen parts 53 and 55 which are made an integral part of the butterfly valve shaft by means of the screw 54 screwed into the end of said shaft, and hence the valve head 38 is permitted to move from one seat to another thru the medium of its own weight under the influence of gravity and the suction brought to bear upon its lower face from the motor. Spring 43 is provided as an auxiliary to assist in thus reseating the valve if needs be.

When the valve 38 is seated as a result of the operation just described, atmospheric air is permitted to flow thru the passage 36 into the valve chamber 31 and thence into the conduit 19 by virtue of the valve head being displaced from its normal seat to that wherein its reseating closes aperture at seat 34. Such inflow of air into the line 19 wherein suction previously retained the piston in the retracted position now counteracts such suction therein created and permits piston to move in cylinder 12 to its normal or engaged position under the urge of spring pressure exerted by clutch springs and springs provided for such purpose in the piston's cylinder. When the valve head is on its seat closing passage to conduit 19 sufficient clearance is provided between parts 37 and 35x to permit the proper engagement of the clutch mechanism, whereby a slow start is made possible. When a fast start is desired the vacuum in the motor is reduced to a lower point by further depressing the foot throttle whereby the butterfly valve opening is increased.

Upon release of the pressure by the foot upon the accelerator 66 at such a period when the latter is at the idling position, pin 58 actuates arm 9 to elevate the valve 38, wherein the passage 36 is closed, and passage thru aperture at seat 34 is opened. By virtue of the latter operation suction is again produced in conduit 19, piston in cylinder is again retracted.

When the throttle is closed valve 38 is withdrawn from its lower seat and suction is equal in conduit 19 and carburetor flange inlet. When throttle is slightly opened pin 58 releases lever 9 and valve is seated with some vacuum pressure on bottom side as before. As butterfly valve is further opened vacuum below valve 38 is reduced permitting said valve to rise in passage 36 closing it and permits vacuum to pass thru line 19 for fast clutch engagement.

In order that the cycle of operations just described may be performed by mechanism which make them feasible for adoption I have introduced into such mechanism set forth in my previous applications additional features which contribute to increase the efficiency of the device and overcome objectionable features found to exist in certain patented constructions which contribute to make them impractical if not inoperative.

Along with these features of the piston and cylinder construction are the salient features previously pointed out in connection with the valve.

These features directed to the particular valve and piston construction form the basis for separate applications and will be claimed therein per se.

In the modification of the invention shown in Figs. 6, 7, and 8, the valve body 71 is shown supported by and between the front brake rod section 72 and the rear brake rod section 73, said rear rod section 73 serving as a brake operating means additional to the air pressure operated means which is controlled by the valve mechanism associated with the valve body 71.

The rear end of the rod section 72 is screwed into a threaded socket provided therefor in the front end of valve body 71, a lock nut 74 being added to cooperate with the screw threaded connection thus afforded.

At the opposite end of the valve body the same is furnished with a cylindrical wall 75, the otherwise open end of which is closed by the rod section 73 in conjunction with a cap or nut 76 which, together with its annular extension 76x, has thru it a bore thru which said rod section extends with a working fit. The passage or chamber within cap 76 is designated 76c. A cup-shaped structure is formed by the valve casing, having within it a valve chamber 77. Within this chamber is mounted a valve member consisting of a convex valve head 78 having a frusto-conical stem 79 which is shown integral with the rod section 73. The head of this valve joins the large end of its frusto-conical stem as in the embodiment of the invention previously described. Between the head and stem of this valve is shown an annular shoulder 81 over the peripheral face of which fits the compression spring 82 while the lateral face of said shoulder forms an annular valve seat engaging portion which cooperates with the annular valve seat afforded by an annular combined valve guide and valve seat member 83.

Said member 83 at its inner side abuts against an annular shoulder 84, being held against said shoulder by the inserted nut 76, and from the viewpoint of its operative relation to the valve said member 83 forms an extension of said nut. A frusto-conical passage 85 thru the valve guide member 83 fits closely around the valve stem 79 when the valve is in a seated relation to said member, but when the valve is unseated therefrom an annular air passage results within said passage around said stem. The valve compression spring 82 acts between the valve head 78 and the annular valve seat member 83, said member having a tubular extension 87 around which said spring extends.

The inner and convex face of the valve head 78 cooperates with a valve seat ring 88 around the mouth of a passageway 89 which has an outlet portion 91 to be placed in communication with the motor. At the opposite side of the seat afforded by said ring the valve chamber is furnished with an opening or passage 92 to be placed in communication with a power unit.

A plurality of protected restricted air passage means 95 are furnished thru the nut 76 which need not be described in detail for they are shown constructed in the same manner as the corresponding air passage structure which has already been described as a part of the form of the invention disclosed in Figs. 1 to 5.

In Fig. 8 the valve head 78 is shown in the position which it assumes when the brake pedal is depressed thereby applying traction to the rod section 72 and moving the valve casing to the right as seen in Fig. 8, thus compressing spring 82 and withdrawing the valve seat ring 88 from the convex face of the valve head 78, and at the same time closing the other valve seat adjacent to shoulder 81. In this position of the valve head engine suction is applied through the passage 91 to the interior of the valve casing and thence, thru the passage 92, to the cylinder of the piston which operates the clutch. When the operator withdraws pressure from the pedal the usual brake retracting spring causes the rod section 72 to be moved in the opposite (left hand) direction thereby closing the valve upon the seat adjacent to the passage way 89 and withdrawing the shoulder 81 from the other valve seat. Suction thru passage 91 is thus cut off from valve chamber 77 which is at the same time put in communication with atmospheric air pressure thru the clearance produced around the valve stem shank 79, which in turn communicates through the cap chamber 76c with the guard inlet means 95.

What is claimed is:

1. A valve device comprising a body portion having a chamber therein and an aperture opening into said chamber, said body comprising a seat portion surrounding said aperture at an end of said chamber, said body having a passageway therein communicating with said chamber thru the medium of said aperture, said passageway communicating with a hole or holes extending thru said body portion, said body having a second aperture and a third aperture therein opening into said chamber, a cap member overlying said second aperture and a nut member in said third aperture, said cap member and said nut member each having through them an aperture opening into said chamber, a valve, said valve comprising a head portion and a shank portion, said valve head being positioned in said chamber and said shank being positioned in said cap aperture, said shank at different points along its length being of less cross sectional area than said cap aperture at such points said valve head comprising a seat portion, the inner end of said cap member having a coacting seat portion, and a coiled spring surrounding said shank and engaging said valve head and said cap.

2. A valve device comprising a body portion, consisting of a housing formed by recessing only one of its end portions, having a chamber adjacent said recess and an aperture leading from said recess into said chamber, said body comprising a seat portion surrounding said aperture at an end of said chamber, said body having a passageway therein communicating with said chamber thru the medium of said aperture and adapted to be placed in communication with an engine suction passage; said body having a second aperture therein opening into said chamber, a cap member overlying said recess, said cap member having through it an aperture adapted to be placed in communication with said chamber, a valve, said valve comprising a head portion and a shank portion, said valve head being positioned in said chamber to control the flow of fluid past said seat and said shank being positioned in and forming a valve to control said cap aperture.

3. A valve device comprising a body portion insertable between an engine manifold and carburetor manifold, said body portion having a chamber therein and an aperture opening into said chamber, said body comprising a seat portion surrounding said aperture at an end of said chamber, said body having a passageway therein communicating with said chamber thru the medium of said aperture, said passageway communicating with a hole or holes extending through said body portion for placing said valve in direct communication with each of said manifolds; said body having a second aperture therein opening into said chamber, said body having a third aperture therein opening into said chamber, a cap member overlying said second aperture, said cap member having through it an aperture opening into said chamber, a valve, said valve comprising a head portion and a shank portion, said valve head being positioned in said chamber and said shank being positioned in said cap aperture, said shank being of less cross sectional area than said cap aperture, said valve head comprising a seat portion, the inner end of said cap member having a coacting seat portion, and a coiled spring surrounding said shank and engaging said valve head and said cap.

4. In a valve structure, a casing having therein a cup-shaped chamber which is diametrically reduced in its bottom portion thereby providing a bottom passage and a valve seat surmounting said passage, a cap for the upper part of said chamber, said cap having thru it a frusto conical interiorly widening passage surrounded by an inward extension of the cap, a valve head having an upper face engageable with said extension to control the passage therethru and a lower face to cooperate with the aforementioned valve seat, and a frusto conical operating stem for said valve which fits within said frusto conical passage when the valve is in its upper closed position.

5. In a valve structure, a casing having a cap which forms a closure for a wall portion thereof, there being a passage thru said cap, said cap having an inward extension surrounding said passage, a guide pin for said valve projecting into said casing from the side thereof which is opposite to said cap, said valve having a stem which projects thru and beyond said passage thru the cap, and operating means for said valve connected with the projecting portion of said stem, there being additional passages in said casing whereby a three-way valve structure is produced.

6. In a valve structure of the kind described, a valve casing having therein passages provided with oppositely directed valve seats, a valve head in said chamber having opposite faces, each of said faces cooperating with one of said valve seats, a valve stem for said head a portion of which projects exteriorly of said casing, said stem having in it a laterally opening recess, and a swingably mounted operating arm for said valve, the free end portions of said arm having a circular enlargement loosely fitted within said recess.

7. In a device of the kind described, in combination, a brake rod having two alined sections which have adjacent end portions in a spaced relation to each other, one of said sections being a front section and the other a rear section, a valve casing of a cup-shape having a nut or cap screwed into its mouth portion, said nut having air inlets and having also a bore thru it within which said rear rod section has a working fit, a valve head within said casing and having a frusto-conical stem or shank portion that constitutes an axial extension of said rear rod section, said head being on the larger end of said frustro-conical shank, an annular valve seat member mounted within said valve casing and having thru it a frustro-conical passage within which said shank may fit and from which it may be withdrawn by movements of the valve to produce an air passage around it, there being another valve seat within said casing at the opposite side of said head, and there being two additional passages communicating with said valve casing, said valve in cooperation with the last recited valve seat controlling communication between said additional passages, and aforesaid front brake rod section being secured to the bottom portion, structurally considered, of said cup-shaped valve casing.

McKINLEY PALMER.